United States Patent
Nakamura et al.

(10) Patent No.: US 12,534,948 B2
(45) Date of Patent: Jan. 27, 2026

(54) CONTROL APPARATUS

(71) Applicant: ALPS ALPINE CO., LTD., Tokyo (JP)

(72) Inventors: Toshiki Nakamura, Miyagi (JP); Makoto Abe, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 191 days.

(21) Appl. No.: 18/461,059

(22) Filed: Sep. 5, 2023

(65) Prior Publication Data

US 2023/0407693 A1 Dec. 21, 2023

Related U.S. Application Data

(63) Continuation of application No. PCT/JP2022/000204, filed on Jan. 6, 2022.

(30) Foreign Application Priority Data

Mar. 8, 2021 (JP) ................................. 2021-036090

(51) Int. Cl.
*E05F 15/00* (2015.01)
*B60J 1/12* (2006.01)

(52) U.S. Cl.
CPC .............. *E05F 15/00* (2013.01); *B60J 1/12* (2013.01); *E05Y 2400/44* (2013.01); *E05Y 2400/85* (2013.01); *E05Y 2900/55* (2013.01)

(58) Field of Classification Search
CPC ......... E05F 15/00; E05F 15/695; E05F 15/75; E05F 15/689; B60J 1/12; E05Y 2400/44;

(Continued)

(56) References Cited

U.S. PATENT DOCUMENTS

2002/0158596 A1* 10/2002 Pehrson ................. B60J 7/0573
318/445
2008/0313965 A1* 12/2008 Sugawara ............. E05F 15/695
49/404

(Continued)

FOREIGN PATENT DOCUMENTS

JP S58-023972 U 2/1983
JP 2006-125099 5/2006
JP 2017-124726 7/2017

OTHER PUBLICATIONS

International Search Report for PCT/JP2022/000204 mailed on Mar. 22, 2022.

*Primary Examiner* — Anne Marie Antonucci
*Assistant Examiner* — Luis G Del Valle
(74) *Attorney, Agent, or Firm* — IPUSA, PLLC

(57) ABSTRACT

A control apparatus includes a selection input unit for receiving a selection operation to select either a first or second operation target provided in a vehicle as an operation target; an operation input unit for receiving an operation input for operating the operation target; and a control unit for operating the operation target according to either one of a first operation input that operates the operation target only while the operation input is being performed or a second operation input that causes the operation target to perform a continuous operation until a maximum or minimum operation amount. The control unit changes the continuous operation of the first operation target when the second operation target is selected while the first operation target is performing the continuous operation, or the second operation target is selected and the first or second operation input is performed with respect to the second operation target.

8 Claims, 5 Drawing Sheets

(58) Field of Classification Search
CPC ............. E05Y 2400/85; E05Y 2900/55; E05Y 2400/854; E05Y 2400/86; B60K 2360/1434; B60K 35/10; B60R 16/02
See application file for complete search history.

(56) References Cited

U.S. PATENT DOCUMENTS

| | | | |
|---|---|---|---|
| 2016/0027596 A1* | 1/2016 | Mori | B60N 2/797 |
| | | | 200/5 A |
| 2017/0361685 A1* | 12/2017 | Schwarz | B60J 1/17 |
| 2020/0131839 A1* | 4/2020 | Iwano | E05F 15/73 |

* cited by examiner

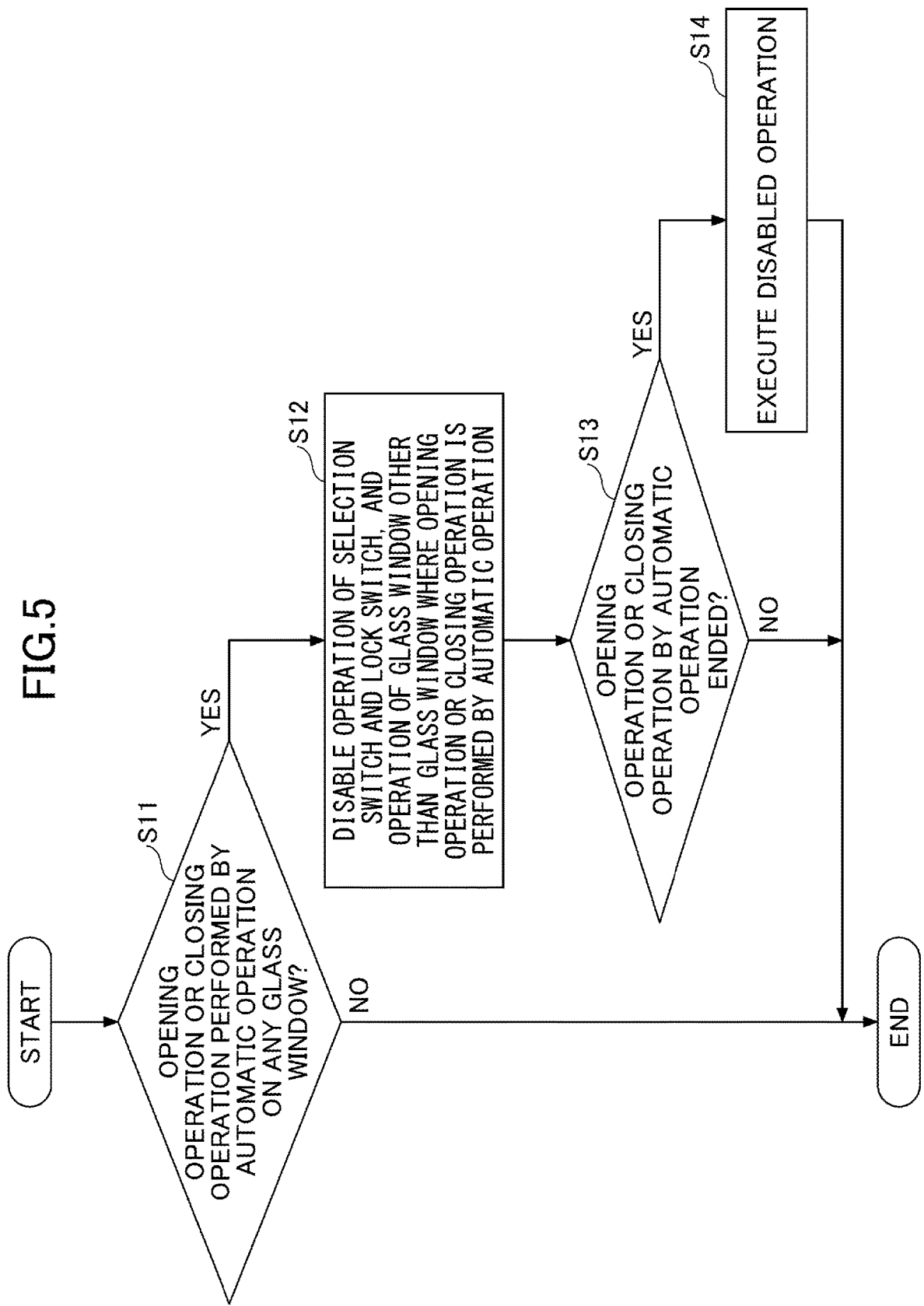

CONTROL APPARATUS

CROSS-REFERENCE TO RELATED APPLICATION

The present application is a continuation application of International Application No. PCT/JP2022/000204 filed on Jan. 6, 2022, which is based on and claims priority to Japanese Patent Application No. 2021-036090 filed on Mar. 8, 2021. The contents of these applications are incorporated herein by reference in their entirety.

BACKGROUND OF THE PRESENT INVENTION

1. Field of the Present Invention

The present invention relates to a control apparatus.

2. Description of the Related Art

Conventionally, there is a power window switch that operates four side windows on the front, rear, left, and right sides of a vehicle. This power window switch includes a switch that operates the right side window; a switch that operates the left side window; a selection switch that allows selection of the front seat side window, selection of the front and rear seat side windows, or selection of the rear seat side window; and a timer unit. The timer unit is turned on when the selection of the front and rear side windows or the selection of the rear side window is performed by the selection switch, and the timer unit is turned off when a predetermined time elapses. When the timer unit is turned off, only the front side window returns to an operable state (see, e.g., Patent Document 1).

[Patent Document 1] Japanese Laid-open Patent Publication No. 2006-125099

SUMMARY OF THE PRESENT INVENTION

A control apparatus according to an embodiment of the present invention includes a selection input unit configured to receive a selection operation by which a user selects a selected operation target from either one of a first operation target or a second operation target that is provided in a vehicle and selectively operable; an operation input unit configured to receive an operation input by which the user operates the selected operation target selected by the selection operation from either one of the first operation target or the second operation target; and a control unit configured to operate the selected operation target according to the selection operation performed at the selection input unit and the operation input performed at the operation input unit, wherein the control unit operates the selected operation target according to either one of a first operation input that operates the selected operation target only while the operation input is being performed at the operation input unit or a second operation input that causes the selected operation target to perform a continuous operation by one input of the operation input until an operation amount of the selected operation target becomes a maximum operation amount or the operation amount of the selected operation target becomes a minimum operation amount, and wherein the control unit changes the continuous operation of the first operation target in response to detecting that the selection operation of selecting the second operation target is performed when the first operation target is being caused to perform the continuous operation until the operation amount becomes the maximum operation amount or the minimum operation amount according to the second operation input, or the selection operation of selecting the second operation target is performed, and the first operation input or the second operation input is performed with respect to the second operation target.

BRIEF DESCRIPTION OF THE DRAWINGS

FIG. 5 is a flow chart illustrating the second processing executed by the control unit.

DETAILED DESCRIPTION OF THE PREFERRED EMBODIMENTS

In the case of the conventional power window switch, during an automatic operation to entirely close the side window of the front seat in a state where the side window of the front seat is selected by the selection switch, when the selection by the selection switch is switched such that the side window of the rear seat is selected, and the side window of the rear seat is operated, the side window of the front seat cannot be stopped during a closing operation by the automatic operation. This could degrade the usability. Further, when a switch is provided for switching the operation target as in the case of this conventional power window switch, the same problem may occur even when the operation target is something other than the power window.

Therefore, an object of the present invention is to provide a switchable type control apparatus having good usability.

The following is a description of an embodiment to which the control apparatus of the present invention is applied.

Embodiment

Figure 1:
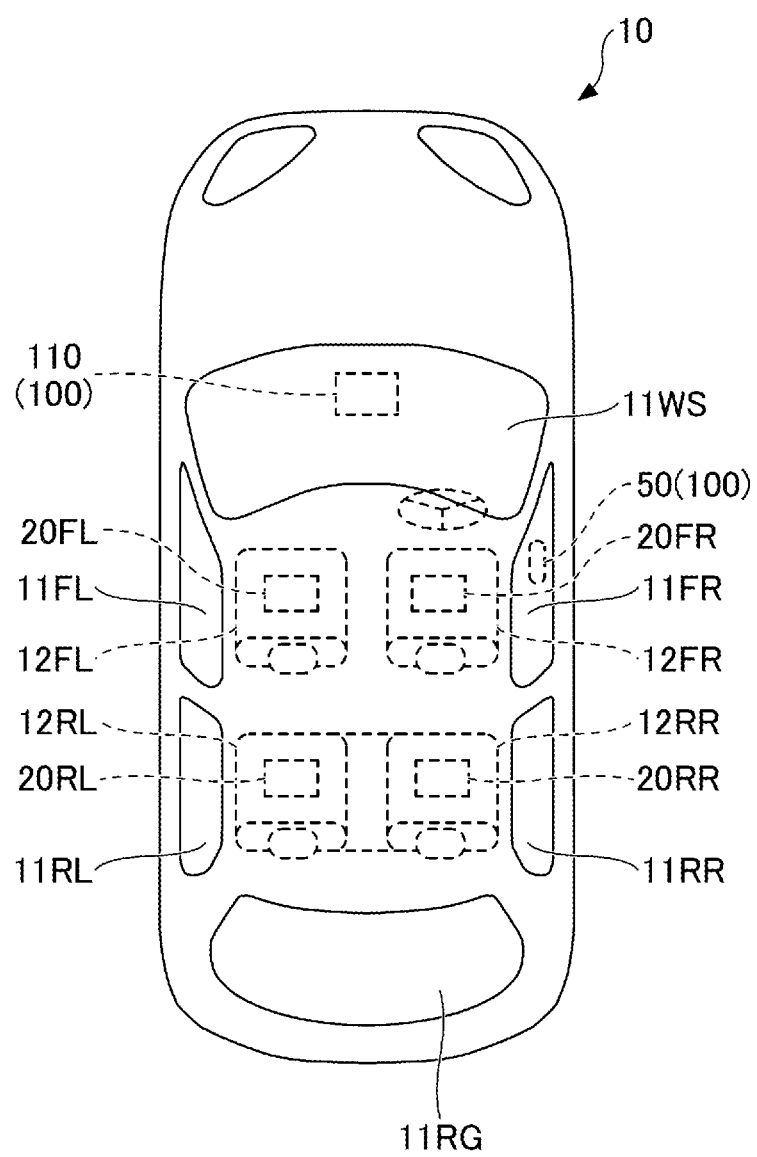
FIG. 1 is a plan view illustrating a vehicle.

FIG. 1 is a plan view illustrating a vehicle 10. The vehicle 10 is equipped with a control apparatus 100 of the embodiment. The vehicle 10 has glass windows 11WS, 11FR, 11FL, 11RR, 11RL, and 11RG, seats 12FR, 12FL, 12RR, and 12RL, seating sensors 20FR, 20FL, 20RL, and 20RR, a power window switch 50, and a control unit 110. The power window switch 50 and the control unit 110 constitute the control apparatus 100. The seating sensors 20RL and 20RR are examples of a seated person detecting unit.

The glass window 11WS (windshield) is the windshield of the vehicle, the glass window 11FR is the right front side glass window of the vehicle 10, and the glass window 11FL is the left front side glass window of the vehicle 10. The glass window 11RR is the right rear side glass window of the vehicle 10, the glass window 11RL is the left rear side glass window of the vehicle 10, and the glass window 11RG is the rear glass window of the vehicle 10.

As an example, the vehicle 10 is a right hand-drive vehicle whose steering wheel is located on the right side in the traveling direction (upward direction in FIG. 1). The seat 12FR is a right front seat (driver's seat), the seat 12FL is a left front seat (passenger's seat), the seat 12RR is a right rear seat, and the seat 12RL is a left rear seat. The seat 12FR is a seat adjacent to the glass window 11FR, the seat 12FL is a seat adjacent to the glass window 11FL, the seat 12RR is a seat adjacent to the glass window 11RR, and the seat 12RL is a seat adjacent to the glass window 11RL.

Here, regarding the glass windows 11FR and 11FL at the front seat and the glass windows 11RR and 11RL at the rear seat of the vehicle 10, if each of the glass windows 11FR and 11FL at the front seat is an example of a first operation target and a first window, each of the glass windows 11RR and 11RL at the rear seat is an example of a second operation target and a second window. On the contrary, if each of the glass windows 11RR and 11RL at the rear seat is an example of a first operation target and a first window, each of the glass windows 11FR and 11FL at the front seat is an example of a second operation target and a second window. Further, the seat adjacent to the first window is an example of a first seat, and the seat adjacent to the second window is an example of a second seat.

The power window switch 50 is provided on the seat 12FR (driver's seat) and is a switch that can operate the opening and closing of the four glass windows 11FR, 11FL, 11RR, and 11RL, which are the side windows of the vehicle 10. The power window switch 50 is provided on the inner lining of the door of the seat 12FR, as an example. The seats 12FL, 12RR, and 12RL are provided with power window switches that can operate only the adjacent glass windows 11FL, 11RR, and 11RL, respectively, but illustration is omitted here.

The control unit 110 is an ECU (Electronic Control Unit; vehicle control device) mounted on the vehicle 10 to control the power window of the vehicle 10. Details of the control unit 110 will be described later with reference to FIG. 3.

The seating sensors 20FR, 20FL, 20RL, and 20RR are provided in the interior of the seats 12FR, 12FL, 12RL, and 12RR, at a part corresponding to the seat surface or backrest, and detect the presence or absence of a seated person. The seating sensors 20FR, 20FL, 20RL, and 20RR can use, for example, a pressure sensor that detects the pressure applied to the seat surface or backrest, or an electrostatic sensor that detects the change in capacitance with the presence or absence of a seated person, etc. The seating sensors 20FR, 20FL, 20RL, and 20RR output sensor signals indicating the presence or absence of a seated person to a control unit described later.

Figure 2:
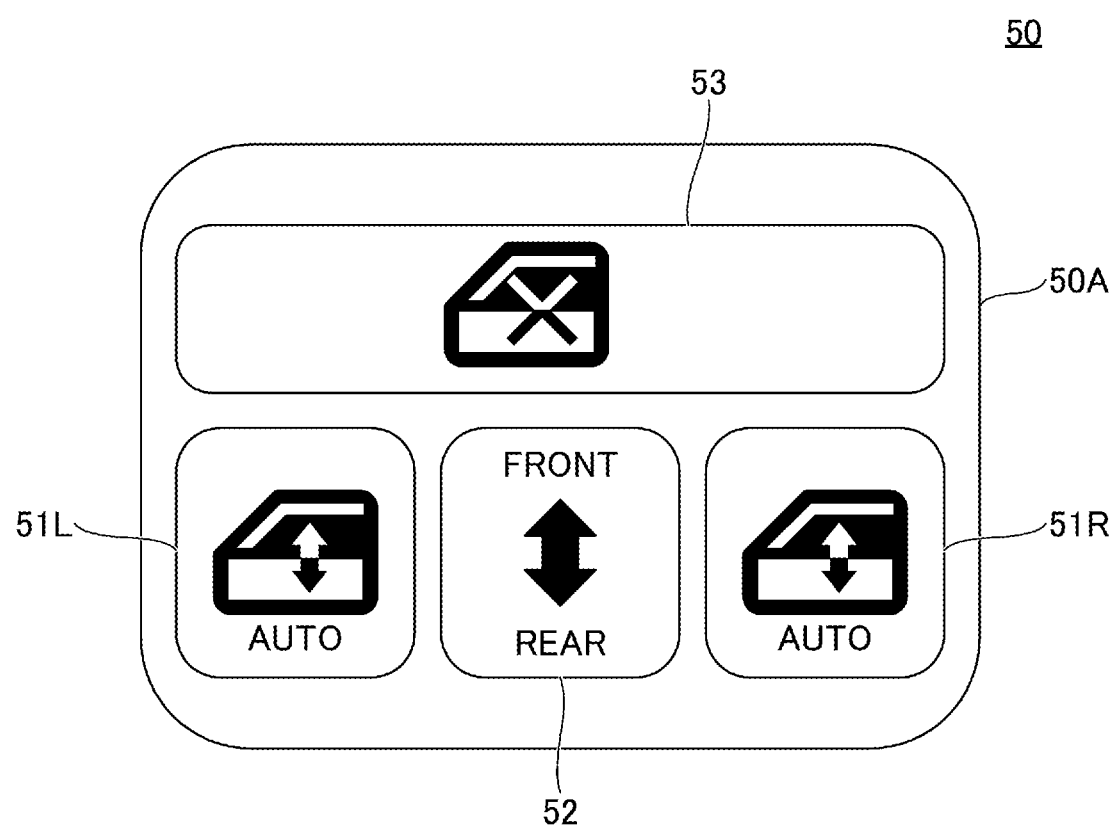
FIG. 2 is a diagram illustrating a power window switch.

FIG. 2 illustrates the power window switch 50. The power window switch 50 includes a housing 50A, switches 51R and 51L, the selection switch 52, and a lock switch 53. The selection switch 52 is an example of a selection input unit that receives a selection operation in which a user selects either a first operation target or a second operation target that can be selectively operated. Among the first operation target and the second operation target, the operation target selected by the selection operation with respect to the selection switch 52 is an example of a selected operation target. Among the first operation target and the second operation target, the operation target that is no longer selected by the selection operation with respect to the selection switch 52 is an example of a non-selected operation target. The switches 51R and 51L are examples of operation input units that receive an operation input in which the user operates the selected operation target selected by the selection operation.

The switches 51R and 51L, the selection switch 52, and the lock switch 53 may be any type of switch, for example, a mechanical switch such as a push-pull type switch or a seesaw type rocker switch that moves with the user's pressing or pulling operation, or a switch that detects the user's touch or gesture operation with an electrostatic sensor or the like. Here, as an example, the form of a mechanical switch will be described.

The housing 50A is the housing of the power window switch 50 and houses the switches 51R, 51L, the selection switch 52, and the lock switch 53.

The selection switch 52 is a switch that receives a selection operation in which the user selects either the glass windows 11FR, 11FL at the front seat (FRONT) or the glass windows 11RR, 11RL at the rear seat (REAR). The selection operation is to operate the selection switch 52, and here, as an example, a pressing operation to press the selection switch 52 is performed. By performing a selection operation on the selection switch 52, it is possible to switch the selected operation target, between the glass windows 11FR and 11FL at the front seat (FRONT) and the glass windows 11RR and 11RL at the rear seat (REAR).

The lock switch 53 is a switch to switch between permission or prohibition (lock) of the operation by the power window switch provided in the seats 12FL, 12RR, and 12RL for the glass windows 11FL, 11RR, and 11RL, other than the driver's seat.

The switch 51R is a switch to operate the opening and closing of the right glass windows 11FR and 11RR. When the front seat (FRONT) is selected by the selection switch 52, the glass window 11FR can be operated by the switch 51R, and when the rear seat (REAR) is selected by the selection switch 52, the glass window 11RR can be operated by the switch 51R.

The switch 51L is a switch for operating the opening and closing of the left glass windows 11FL, 11RL. When the front seat (FRONT) is selected by the selection switch 52, the glass window 11FL can be operated by the switch 51L, and when the rear seat (REAR) is selected by the selection switch 52, the glass window 11RL can be operated by the switch 51L.

In this way, the switches 51R and 51L receive an input operation in which the user operates the operation object selected by a selection operation with respect to the selection switch 52.

Here, as an example, for the glass windows 11FR, 11RR, 11FL, and 11RL, a non-automatic operation and an automatic operation are possible with the switches 51R and 51L. The non-automatic operation is an operation to open and close the glass window 11FR only while the switch 51R or 51L is operated, and is an example of a first input operation. Further, the automatic operation is an operation to continuously operate the glass windows 11FR, 11RR, 11FL, and 11RL until the glass windows are entirely opened or entirely closed by a single operation on the switch 51R or 51L, and is an example of a second input operation. Further, entirely opened is an example of a maximum operation amount at which the operation amount becomes maximum, and entirely closed is an example of a minimum operation amount at which the operation amount becomes minimum.

The power window switch 50 is provided at the seat 12FR (driver's seat) and is a switch that can operate the opening and closing of the four glass windows 11FR, 11FL, 11RR, and 11RL by the switches 51R and 51L, by selecting the front seat (FRONT) or the rear seat (REAR) by the selection switch 52. By providing the selection switch 52, the number of switches 51R and 51L is reduced to save space and reduce cost.

Figure 3:
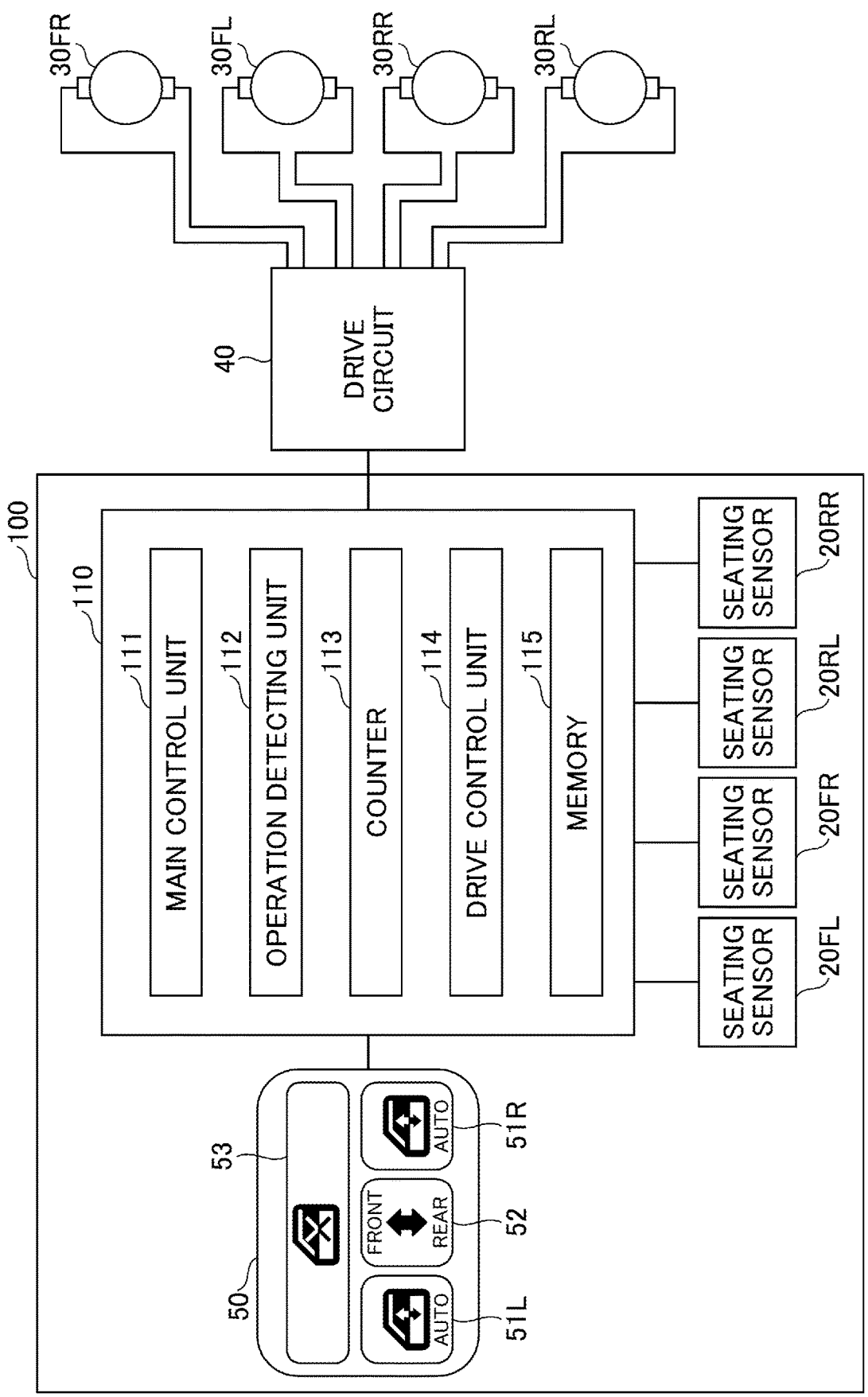
FIG. 3 is a diagram illustrating a control apparatus according to the embodiment.

FIG. 3 is a diagram illustrating the control apparatus 100 of the embodiment. FIG. 3 illustrates motors 30FR, 30FL, 30RR, and 30RL and a drive circuit 40 in addition to the control apparatus 100. The motors 30FR, 30FL, 30RR, and 30RL drive the glass windows 11FR, 11FL, 11RR, and 11RL, respectively. The motors 30FR, 30FL, 30RR, and 30RL are connected to the control apparatus 100 via the drive circuit 40.

The control apparatus 100 includes the power window switch 50, the control unit 110, and the seating sensors 20FR, 20FL, 20RL, and 20RR. The control unit 110 is connected to the seating sensors 20FL, 20RL, and 20RR, and the power window switch 50.

The control unit 110 is an ECU that controls the power window of the vehicle 10, and is implemented by a computer or a microcomputer including a CPU (Central Processing Unit), a RAM (Random Access Memory), a ROM (Read Only Memory), a HDD (Hard Disk Drive), an input/output interface, and an internal bus.

The control unit 110 includes a main control unit 111, an operation detecting unit 112, a counter 113, a drive control unit 114, and a memory 115. The counter 113 is an example of a counting unit. The main control unit 111, the operation detecting unit 112, the counter 113 and the drive control unit 114 represent functions of programs executed by the control unit 110 as functional blocks. Further, the memory 115 is a functional representation of the memory of the control unit 110.

The main control unit 111 is a processing unit that controls the overall control processing of the control unit 110 and performs processing other than that performed by the operation detecting unit 112, the counter 113, and the drive control unit 114.

The operation detecting unit 112 detects the operation to the switches 51R, 51L, the selection switch 52, and the lock switch 53 of the power window switch 50, and transmits an operation signal representing the operation content to the counter 113, the drive control unit 114, and the memory 115.

The counter 113 starts counting when an automatic operation is performed on the glass window that is the selected operation target, and counts the time until the selected operation target is switched by the selection switch 52 and the automatic operation or non-automatic operation is performed on the glass window that is the new selected operation target. When the counter 113 completes the counting, the counter 113 transmits a completion signal representing completion to the drive control unit 114. When the counter 113 completes the counting and transmits a completion signal to the drive control unit 114, the counter 113 resets the count time to zero.

The drive control unit 114 performs drive control of the motors 30FR, 30FL, 30RR, and 30RL based on an operation signal received from the operation detecting unit 112. When performing drive control of the motors 30FR, 30FL, 30RR, and 30RL, the drive control unit 114 performs control processing by using the operation signal received from the operation detecting unit 112, the completion signal received from the counter 113, and the sensor signal received from the seating sensors 20RL and 20RR.

The memory 115 stores programs, data and the like necessary for the operation detecting unit 112, the counter 113, and the drive control unit 114 to execute processing.

When the drive control unit 114 of the control unit 110 as described above receives an operation signal from the operation detecting unit 112 indicating a non-automatic opening/closing operation of the glass windows 11FR, 11FL, 11RR, and 11RL, the drive control unit 114 opens/closes the glass windows 11FR, 11FL, 11RR, and 11RL by driving the motors 30FR, 30FL, 30RR, and 30RL according to the operation signal. This operation opens/closes the glass windows 11FR, 11FL, 11RR, and 11RL by non-automatic operation. However, when an automatic operation is performed, the control unit 110 executes the processing illustrated in FIG. 4.

Figure 4:
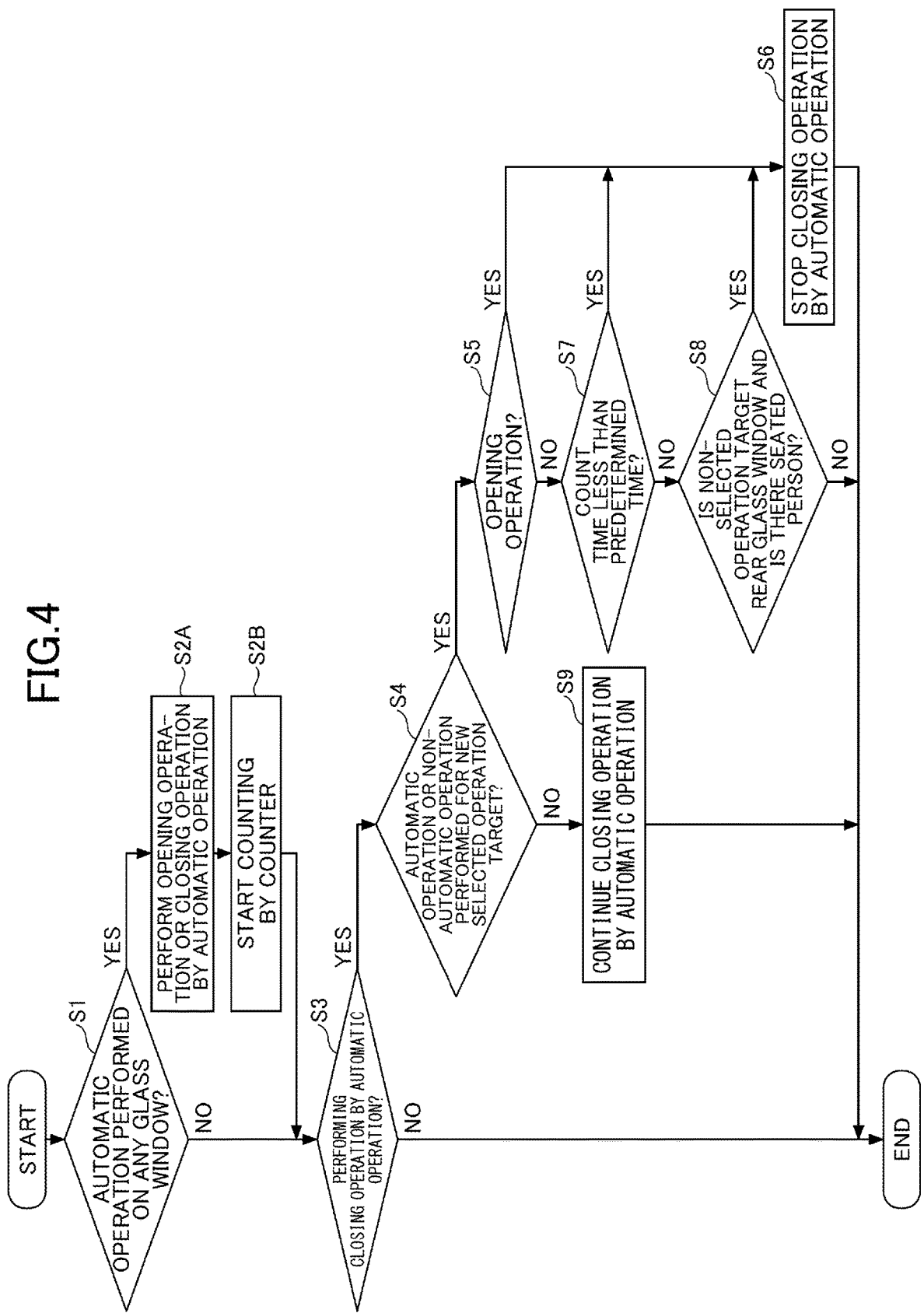
FIG. 4 is a flow chart illustrating the first processing executed by a control unit.

FIG. 4 is a flowchart illustrating the first processing executed by the control unit 110. The processing illustrated from start to end in FIG. 4 is repeatedly executed at a predetermined control cycle when the power of the control unit 110 is turned on. Hereafter, any one of the glass windows refers to at least one of the glass windows 11FR, 11FL, 11RR, and 11RL.

The operation detecting unit 112 determines whether an automatic operation has been performed on any of the glass windows (step S1). When an operation detecting unit 112 determines that an automatic operation has been performed on any of the glass windows (S1: YES), the operation detecting unit 112 transmits an operation signal indicating that an automatic operation has been performed to the counter 113 and the drive control unit 114.

Based on the information identifying the glass window included in the operation signal indicating that automatic operation has been performed, the drive control unit 114 drives a motor (any of the motors 30FR, 30FL, 30RR, and 30RL) corresponding to the glass window to perform the opening or closing operation on the glass window (any of the glass windows 11FR, 11FL, 11RR, and 11RL) by an automatic operation (step S2A). When the drive control unit 114 outputs a drive instruction for an automatic operation identifying a glass window to the drive circuit 40, the corresponding motor is driven to perform the opening or closing operation on the glass window by automatic operation.

When the counter 113 receives an operation signal indicating that the automatic operation has been performed from the operation detecting unit 112, the counter 113 starts counting (step S2B). When step S2B is completed, the flow proceeds to step S3. The flow also proceeds to step S3 when the operation detecting unit 112 determines that no automatic operation is performed on any of the glass windows (S1: NO).

The main control unit 111 determines whether the glass window automatically operated in step S1 is being closed by an automatic operation (step S3). The processing in step S3 is that the main control unit 111 determines whether there is a drive instruction output from the drive control unit 114.

When the main control unit 111 determines that the glass window automatically operated in step S1 is being closed by an automatic operation (S3: YES), the operation detecting unit 112 determines whether an automatic operation or a non-automatic operation has been performed on the glass window newly selected as the selected operation target by switching the selected operation target with the selection switch 52 (step S4). When the selected operation target is switched by the selection switch 52 between the front glass windows 11FR and 11FL and the rear glass windows 11RR and 11RL after the automatic operation has been performed, a situation may arise in which the operation cannot be immediately performed on the glass window as the non-selected operation target that is being closed by the automatic operation. Therefore, in step S4, the condition is that the selected operation target is switched by the selection switch 52 and a new operation is performed on the selected operation target.

When the operation detecting unit 112 determines that an automatic operation or a non-automatic operation has been performed on the glass window that has become the new selected operation target (S4: YES), the operation detecting unit 112 determines whether an opening operation is performed (step S5). When the glass window that is performing the closing operation by the automatic operation is a non-selected operation target, and an operation in the direction opposite to the opening/closing direction of the non-selected operation target is performed on the glass window that is the selected operation target that is newly selected, it may be possible that the closing operation performed on the glass window that has become the non-selected operation target may have been performed against the user's intention, and, therefore, it is determined whether an opening operation is performed.

When it is determined by the operation detecting unit 112 that an opening operation is performed (S5: YES), the drive control unit 114 stops the glass window that has started the closing operation by the automatic operation in step S2A (step S6). More specifically, the drive control unit 114 stops the output of the drive instruction to the motor corresponding to the glass window that has started the closing operation by the automatic operation in step S2A. This stops the closing operation of the glass window that has started the closing operation by the automatic operation in step S2A.

In step S6, the glass window that has started the closing operation by the automatic operation in step S2A is stopped, because the operation, which is performed for the glass window that is the selected operation target that is the newly selected object, is in the opposite direction to the closing operation by the automatic operation for the non-selected operation target, and the closing operation performed for the glass window that is the non-selected operation target, before switching the operation target, may have been performed against the user's intention, and, therefore, the closing operation by the automatic operation for the non-selected operation target is stopped.

Further, when it is determined by the operation detecting unit 112 that an opening operation is not performed (S5: NO), the drive control unit 114 determines whether the time counted by the counter 113 is less than or equal to a predetermined time (step S7).

When it is determined that the time counted by the counter 113 is less than or equal to a predetermined time (S7: YES), the drive control unit 114 advances the flow to step S6 to stop the glass window that has started the closing operation by the automatic operation in step S2A (step S6). The predetermined time is, for example, approximately two seconds.

The time counted by the counter 113 is the elapsed time from the time when the automatic operation is performed on the glass window that is the selected operation target to the time when the selected operation target is switched and an automatic operation or a non-automatic operation is performed on the glass window that is the new selected operation target. The fact that the time counted by the counter 113 is less than or equal to the predetermined time indicates that the automatic operation or the non-automatic operation on the glass window that is the new selected operation target, was mistakenly performed as the operation on the glass window that is the previous selected operation target, and may not have been intended to be performed; and the fact that the time counted by the counter 113 is longer than the predetermined time indicates that it can be considered that the automatic operation or the non-automatic operation on the glass window that is the newly selected operation target is an operation that has been fully considered (intended).

Therefore, the determination of step S7 is provided to stop the automatic operation on the glass window that is the non-selected operation target when the time counted by the counter 113 is less than or equal to the predetermined time. When the time counted by the counter 113 is longer than the predetermined time in step S7, the automatic operation on the glass window that is the non-selected operation target is permitted and the determination of step S8 is made.

When the drive control unit 114 determines that the time counted by the counter 113 is longer than the predetermined time in step S7 (S7: NO), the drive control unit 114 determines whether the glass window that is the non-selected operation target is the rear glass window 11RR or 11RL and the detection result of the seating sensor 20R or 20L indicates that there is a seated person (step S8).

When it is determined that the glass window that is the non-selected operation target is the rear glass window 11RR or 11RL and the detection result of the seating sensor 20R or 20L indicates that there is a seated person (S8: YES), the drive control unit 114 advances the flow to step S6 to stop the glass window that has started the closing operation by the automatic operation in step S2A (step S6).

When the rear glass window 11RR or 11RL becomes the non-selected operation target after the closing operation by the automatic operation is performed for the rear glass window 11RR or 11RL, and a seated person is present at the seat 12RR or 12RL adjacent to the rear glass window 11RR or 11RL where the closing operation by the automatic operation was performed, and when an automatic operation or a non-automatic operation is performed for the front glass window 11FR or 11FL that is the selected operation target that is newly selected, the closing operation by the automatic operation for the glass window adjacent to the rear seat where the seated person is present is stopped. That is, the closing operation by the automatic operation for the glass window adjacent to the rear seat where the seated person is present is stopped. This is to secure safety when, for example, the seated person is a child. The processing of step S8 is a step for stopping the automatic closing operation of the glass window adjacent to the rear seat when there is a seated person at the seat 12RR or 12RL adjacent to the rear glass window 11RR or 11RL.

When it is determined by the drive control unit 114 in step S8 that the glass window that is the non-selected operation target is not the rear glass window 11RR or 11RL or that the glass window that is the non-selected operation target is the rear glass window 11RR or 11RL but the detection result of the seating sensor 20R or 20L does not indicate that there is a seated person (S8: NO), the automatic operation for the non-selected operation target is permitted. When the glass window that is the non-selected operation target is not the rear glass window 11RR or 11RL, this is not subject to step S8, and, therefore, the automatic operation for the non-selected operation target is permitted. When the glass window that is the non-selected operation target is the rear glass window 11RR or 11RL but there is no seated person, the automatic operation for the non-selected operation target is permitted. Because there are no seated person, it is safe to continue the automatic operation.

When the drive control unit 114 determines NO in step S8, the main control unit 111 ends the series of the processing (END). Then, in the next control cycle, the processing illustrated in FIG. 4 is executed repeatedly from start to end.

Note that when the operation detecting unit 112 determines in step S4 that the glass window that is the selected operation target that is newly selected is not operated automatically or not operated non-automatically (S4: NO), the drive control unit 114 continues the closing operation by the automatic operation (step S9). No operation has been performed on the glass window that is the selected operation target that is newly selected, and, therefore, the drive control unit 114 continues the closing operation by the automatic operation for the glass window automatically operated in step S1.

Further, the main control unit 111 ends the series of the processing when it is determined in step S3 that the glass window automatically operated in step S1 is not performing the closing operation by the automatic operation (S3: NO) (END). This is to prepare for the next automatic operation because the closing operation by the automatic operation has been completed.

While the above has described a mode of determining whether a closing operation is being performed by the automatic operation in step S3, it may be determined whether an opening operation is being performed by the automatic operation in step S3. In this case, it is sufficient to determine whether the closing operation that is in the opposite direction of the opening operation is performed in step S5, and to stop the glass window that has started the opening operation by the automatic operation in step S6. Moreover, step S8 is a step for stopping the opening operation by the automatic operation on the glass window adjacent to the rear seat when there is a seated person at the seat 12RR or 12RL adjacent to the rear glass window 11RR or 11RL. Also in the opening operation, this is a step is for securing safety when, for example, the seated person is a child. Further, in step S8, a mode in which a seated person is at the seat 12RR or 12RL adjacent to the rear glass window 11RR or 11RL has been explained, but this may be a configuration in which a seated person is at the seat 12FL.

As described above, according to the first processing, while the glass window that is the selected operation target is being closed or opened in response to the automatic operation, when a selection operation to switch the selected operation target is performed and a non-automatic operation or an automatic operation is performed on the new selected operation target, the operation by the automatic operation on the non-selected operation target is stopped. In this way, when a non-automatic operation or an automatic operation is performed on the new selected operation target, the operation of the non-selected operation target which is difficult to perform immediately is stopped.

Therefore, the switchable type control apparatus 100 having good usability can be provided. Further, when a non-automatic operation or an automatic operation is performed on a glass window that is the new selected operation target, the operation of the glass window that is the non-selected operation target is stopped, and, therefore, the control apparatus 100 in which safety is secured can be provided.

Note that while the above has described the mode of stopping the operation by an automatic operation on the glass window that is the non-selected operation target, for example, the operation by automatic operation may be changed to reduce the operation speed of the automatic operation on the glass window. This is because, when a non-automatic operation or an automatic operation is performed on a new selected operation target, the operation speed of the non-selected operation target that is difficult to operate immediately can be reduced to improve the usability by, for example, giving the user time to operate the power window switch 50, or giving time to the occupant of the seat adjacent to the glass window operated by automatic operation so that the occupant can adapt to the slowly moving glass window.

Further, the above describes a mode in which it is determined in step S4 whether an automatic operation or a non-automatic operation was performed on the glass window, which has become the newly selected operation target as a result of switching the selected operation target by the selection switch 52, and the processing proceeds to step S6 through step S5, S7, or S8. However, in step S4, it may be determined whether the selected operation target has been switched by the selection switch 52, and if the selected operation target has been switched (S4: YES), the processing may proceed to step S6. In this case, for example, the processing of steps S5, S7 and S8 may not be performed.

While a closing operation is performed on the glass window that was the selected operation target by the automatic operation, if a selection operation to switch the selected operation target is performed and a non-automatic operation or an automatic operation is performed on the new selected operation target, the closing operation by the automatic operation on the non-selected operation target is stopped. In this way, the closing operation by the automatic operation on the glass window that is the non-selected operation target is stopped, and, therefore, it is possible to prevent someone's hand from being clamped, etc., and safety can be improved.

Further, when an operation by an automatic operation or a non-automatic operation is performed on a glass window that is the new selected operation target, in a direction opposite to the closing or opening operation by an automatic operation on the non-selected operation target, the closing or opening operation by the automatic operation on the non-selected operation target is stopped. This is because the operation performed on the glass window that is the selected operation target that is newly selected, is in the opposite direction to the operation performed by the automatic operation on the non-selected operation target, and the automatic operation performed before switching the selected operation target on the glass window that has become the non-selected operation target, may have been against the user's intention. Therefore, when the automatic operation performed on the glass window switched to the non-selected operation target, before switching the selected operation target, may have been against the user's intention, by stopping the automatic operation on the glass window that is the non-selected operation target, the switchable type control apparatus 100 having improved usability can be provided.

Further, when the elapsed time counted by the counter 113, from the time when the automatic operation is performed on the glass window that is the selected operation target to the time when the selected operation target is switched and an automatic operation or a non-automatic operation is performed on the glass window that is the new selected operation target, is longer than the predetermined time, it can be considered that an automatic operation or a non-automatic operation on the glass window that is the new selected operation target has been fully considered (intended), and, therefore, the operation by an automatic operation on the glass window that is the non-selected operation target is permitted. Further, when the elapsed time counted by the counter 113 is less than or equal to the predetermined time, it can be considered that an automatic operation or a non-automatic operation on the glass window that is the new selected operation target has not been intended, and, therefore, the operation by an automatic operation on the glass window that is the non-selected operation target is stopped. Therefore, according to the time counted by the counter 113, the operation by the automatic operation on the glass window that is the non-selected operation target can be controlled by understanding the intention of the user, so that the switchable type control apparatus 100 with improved usability can be provided.

Further, when the non-selected operation target is the rear glass window and a closing or opening operation is performed by an automatic operation, and there is a seated person at the seat adjacent to the rear glass window that is the non-selected operation target, the closing or opening operation by the automatic operation for the rear glass window that is the non-selected operation target is stopped, thereby securing safety of the occupants such as children so that the switchable type control apparatus 100 with improved usability can be provided. Further, when the non-selected operation target is the front glass window or when the non-selected operation target is the rear glass window but there is no seated person at the adjacent seat, the closing or opening operation by the automatic operation for the rear glass window that is the non-selected operation target is permitted, thereby permitting the operation by the automatic operation for the glass window that is the non-selected operation target according to the situation, so that the switchable type control apparatus 100 with improved usability can be provided.

Further, the above description is about a mode in which the glass windows 11FR, 11FL, 11RR, and 11RL operated by the power window switch 50 are the operation targets, but the operation targets are not limited to the glass windows 11FR, 11FL, 11RR, and 11RL that are the power windows. The operation target may be, for example, an electric sliding mechanism or an electric reclining mechanism of a power seat, an air volume adjustment mechanism or a temperature adjustment mechanism of an air conditioner, a sound volume adjustment mechanism or a balance adjustment mechanism of audio equipment, etc.

For example, when the amount of operation of an electric sliding mechanism and an electric reclining mechanism of a power seat can be automatically operated to the maximum amount of operation or the minimum amount of operation, the electric sliding mechanism and the electric reclining mechanism can be selected by the selection switch 52, and when the selected operation target is switched while the automatic operation is performed for the non-selected operation target, the same control as above may be performed by the control apparatus 100.

Further, when the amount of operation of the air flow adjustment mechanism and the temperature adjustment mechanism of the air conditioner can be automatically operated to the maximum amount of operation or the minimum amount of operation, the air flow adjustment mechanism and the temperature adjustment mechanism can be selected by the selection switch 52, and when the selected operation target is switched while an automatic operation is performed for the non-selected operation target, the same control as above may be performed by the control apparatus 100.

For example, when the amount of operation of the volume adjustment mechanism and the balance adjustment mechanism of the audio equipment can be automatically operated to the maximum amount of operation or the minimum amount of operation, the volume adjustment mechanism and the balance adjustment mechanism can be selected by the selection switch 52, and when the selected operation target is switched while an automatic operation is performed for the non-selected operation target, the same control as above may be performed by the control apparatus 100.

Therefore, for example, when the operation object is the electric sliding mechanism or electric reclining mechanism of the power seat, the air volume adjustment mechanism or temperature adjustment mechanism of the air conditioner, the volume adjustment mechanism or balance adjustment mechanism of audio equipment, etc., the switchable type control apparatus 100 having good usability can also be provided.

Further, a description has been given above about a mode in which all the glass windows 11FR, 11RR, 11FL, and 11RL described above can be automatically operated, but the only glass window that can be automatically operated may be the glass window 11FR at the driver's seat. In this case, the processing of step S8 for the case where an automatic operation is performed for the rear glass windows 11RR and 11RL need not be performed, and the vehicle 10 need not be provided with the seating sensors 20RR and 20RL.

Further, instead of the first processing illustrated in FIG. 4, the second processing illustrated in FIG. 5 may be performed. FIG. 5 is a flowchart illustrating the second processing performed by the control unit 110. The second processing is a feasible alternative to the first processing. The processing illustrated from start to end in FIG. 5 is repeatedly executed at predetermined control cycles when the power of the control unit 110 is turned on. Hereafter, any one of the glass windows refers to at least one of the glass windows 11FR, 11FL, 11RR, or 11RL.

The main control unit 111 determines whether any of the glass windows is performing the opening or closing operation by automatic operation (step S11).

When the main control unit 111 determines that one of the glass windows is performing the opening or closing operation by an automatic operation (S11: YES), the drive control unit 114 disables the operation of the selection switch 52 and the lock switch 53 and the operation of the switches 51R and 51L for glass windows other than the glass window performing the opening or closing operation by automatic operation (step S12).

The drive control unit 114 determines whether the opening or closing operation by automatic operation has ended for the glass window determined as performing the opening or closing operation by automatic operation in step S11 (step S13). The processing in step S13 may be performed by determining whether the drive control unit 114 has completed the output of the drive instruction to perform the opening or closing operation by automatic operation for the motor corresponding to the glass window determined as performing the opening or closing operation by automatic operation in step S11.

When the drive control unit 114 determines that the opening or closing operation by the automatic operation has ended (S13: YES), the drive control unit 114 executes the operation disabled in step S12 (step S14). When the operation is disabled in step S12, the content of the operation to be disabled is stored in the memory 115, and the drive control unit 114 reads the stored content of the operation in step S14 and automatically executes the operation. When the processing in step S14 is ended, the main control unit 111 ends the series of the processing (END). Then, in the next control cycle, the processing illustrated in FIG. 5 is executed repeatedly from start to end. Note that in step S14, the operation disabled in step S12 may be executed when the operation is performed again, instead of being automatically executed.

Further, when the drive control unit 114 determines in step S13 that the opening or closing operation by the automatic operation has not ended (S13: NO), the main control unit 111 ends the series of the processing (END). This is because the closing operation by the automatic operation that has not ended is also performed in the next control cycle.

Further, when the main control unit 111 determines in step S11 that any of the glass windows is not performing an opening or closing operation by the automatic operation (S11: NO), the main control unit 111 ends the series of the processing (END). This is to return to the processing in step S11.

As described above, according to the second processing, when any of the glass windows is performing the opening or closing operation by an automatic operation, the operation of the selection switch 52 and the lock switch 53 and the operation with switches 51R and 51L for the glass windows other than the glass window performing the opening or closing operation by the automatic operation are disabled, and when the opening or closing operation by the automatic operation has ended, the disabled operation is executed (enabled). Therefore, for the glass window performing the opening or closing operation by the automatic operation, the operation can be changed at any time during the opening or closing operation by the automatic operation.

Therefore, a switchable type control apparatus 100 having good usability can be provided. Further, the operation can be changed at any time during the opening or closing operation by an automatic operation, and, therefore, the control apparatus 100 in which safety is secured can be provided.

Although the control apparatus of an example embodiment of the present invention has been described above, the present invention is not limited to the specifically disclosed embodiment and various modifications and changes can be made without departing from the scope of the claims.

According to an aspect of the present invention, a switchable type control apparatus having good usability can be provided.

What is claimed is:

1. A control apparatus comprising:
a selection input unit configured to receive a selection operation by which a user selects a selected operation target from either one of a first operation target or a second operation target that is provided in a vehicle and selectively operable;
an operation input unit configured to receive an operation input by which the user operates the selected operation target selected by the selection operation from either one of the first operation target or the second operation target; and
a control unit configured to
operate the selected operation target according to the selection operation performed at the selection input unit and the operation input performed at the operation input unit,
wherein the control unit operates the selected operation target according to either one of
a first operation input that operates the selected operation target only while the operation input is being performed at the operation input unit or
a second operation input that causes the selected operation target to perform a continuous operation by one input of the operation input until an operation amount of the selected operation target becomes a maximum operation amount or the operation amount of the selected operation target becomes a minimum operation amount, and
wherein the control unit changes the continuous operation of the first operation target in response to detecting that the selection operation of selecting the second operation target is performed while the first operation target is being caused to perform the continuous operation until the operation amount becomes the maximum operation amount or the minimum operation amount according to the second operation input, or
wherein the control unit changes the continuous operation of the first operation target in response to detecting that while the first operation target is being caused to perform the continuous operation until the operation amount becomes the maximum operation amount or the minimum operation amount according to the second operation input, the selection operation of selecting the second operation target is performed, and the first operation input or the second operation input is performed with respect to the second operation target,
wherein the control apparatus further comprises:
a counting unit configured to count an elapsed time from when the second operation input with respect to the first operation target is performed at the operation input unit, to when the selection operation of selecting the second operation target is performed and the first operation input or the second operation input is performed with respect to the second operation target, wherein
the first operation target and the second operation target are respectively a first window and a second window of the vehicle that are each controlled by the control unit to perform an opening or closing operation, and
the control unit permits the continuous operation of the first window, in response to detecting that the elapsed time counted by the counting unit is longer than a predetermined time, the elapsed time being from when the second operation input is performed with respect to the first window to when the first operation input or the second operation input is performed with respect to the second window, while the first window is being caused to perform the continuous operation until reaching an entirely closed state or an entirely open state according to the second operation input, and
wherein the control unit stops the continuous operation of the first window, in response to detecting that the elapsed time counted by the counting unit is less than or equal to the predetermined time, the elapsed time being from when the second operation input is performed with respect to the first window to when the first operation input or the second operation input is performed with respect to the second window, while the first window is being caused to perform the continuous operation that is performed until reaching the entirely closed state or the entirely open state according to the second operation input.

2. The control apparatus according to claim 1, wherein the control unit stops the continuous operation of the first operation target in response to detecting that
the selection operation of selecting the second operation target is performed while the first operation target is being caused to perform the continuous operation until the operation amount becomes the maximum operation amount or the minimum operation amount according to the second operation input, or
while the first operation target is being caused to perform the continuous operation until the operation amount becomes the maximum operation amount or the minimum operation amount according to the second operation input, the selection operation of selecting the second operation target is performed, and the first operation input or the second operation input is performed with respect to the second operation target.

3. The control apparatus according to claim 1, wherein the control unit stops the continuous operation of the first window performed until reaching an entirely closed state, in response to detecting that
- the selection operation of selecting the second window is performed while the first window is being caused to perform the continuous operation until reaching the entirely closed state according to the second operation input, or
- while the first operation target is being caused to perform the continuous operation until the operation amount becomes the maximum operation amount or the minimum operation amount according to the second operation input, the selection operation of selecting the second window is performed, and the first operation input or the second operation input is performed with respect to the second window.

4. The control apparatus according to claim 3, wherein the first window is a side window of a front seat of the vehicle, and the second window is a side window of a rear seat of the vehicle.

5. The control apparatus according to claim 4, wherein the first window is the side window of a driver's seat of the vehicle, and
the selection input unit and the operation input unit are provided at the driver's seat.

6. The control apparatus according to claim 1, wherein the control unit stops the continuous operation of the first window, in response to detecting that
- the selection operation of selecting the second window is performed while the first window is being caused to perform the continuous operation until reaching an entirely closed state or an entirely open state according to the second operation input, and
- the first operation input or the second operation input for an opposite direction to an opening or closing direction of the first window, is performed with respect to the second window while the first operation target is being caused to perform the continuous operation until the operation amount becomes the maximum operation amount or the minimum operation amount according to the second operation input.

7. The control apparatus according to claim 1, wherein
the first operation target and the second operation target are respectively a first window and a second window of the vehicle that are each controlled by the control unit to perform an opening or closing operation,
the selection input unit and the operation input unit are provided at a first seat adjacent to the first window,
the control apparatus further comprises a seated person detecting unit configured to detect whether a seated person is present at a second seat adjacent to the second window, and
the control unit permits the continuous operation of the second window until reaching an entirely closed state or an entirely open state, in response to detecting that the selection operation of selecting the first window is performed and the first operation input or the second operation input is performed with respect to the first window, while the second window is being caused to perform the continuous operation that is performed until reaching the entirely closed state or the entirely open state according to the second operation input, and the seated person detecting unit detects that the seated person is not present.

8. A control apparatus comprising:
a selection input unit configured to receive a selection operation by which a user selects a selected operation target from either one of a first operation target or a second operation target that is provided in a vehicle and selectively operable;
an operation input unit configured to receive an operation input by which the user operates the selected operation target selected by the selection operation from either one of the first operation target or the second operation target; and
a control unit configured to
operate the selected operation target according to the selection operation performed at the selection input unit and the operation input performed at the operation input unit,
wherein the control unit operates the selected operation target according to either one of
a first operation input that operates the selected operation target only while the operation input is being performed at the operation input unit or
a second operation input that causes the selected operation target to perform a continuous operation by one input of the operation input until an operation amount of the selected operation target becomes a maximum operation amount or the operation amount of the selected operation target becomes a minimum operation amount, and
wherein the control unit changes the continuous operation of the first operation target in response to detecting that
the selection operation of selecting the second operation target is performed while the first operation target is being caused to perform the continuous operation until the operation amount becomes the maximum operation amount or the minimum operation amount according to the second operation input, or
while the first operation target is being caused to perform the continuous operation until the operation amount becomes the maximum operation amount or the minimum operation amount according to the second operation input, the selection operation of selecting the second operation target is performed, and the first operation input or the second operation input is performed with respect to the second operation target,
wherein
the first operation target and the second operation target are respectively a first window and a second window of the vehicle that are each controlled by the control unit to perform an opening or closing operation,
the selection input unit and the operation input unit are provided at a first seat adjacent to the first window,
the control apparatus further comprises a seated person detecting unit configured to detect whether a seated person is present at a second seat adjacent to the second window, and
the control unit permits the continuous operation of the second window until reaching an entirely closed state or an entirely open state, in response to detecting that the selection operation of selecting the first window is performed and the first operation input or the second operation input is performed with respect to the first window, while the second window is being caused to perform the continuous operation that is performed until reaching the entirely closed state or the entirely open state according to the second operation input, and the seated person detecting unit detects that the seated person is not present, and wherein the control unit stops the continuous operation of the second window that is performed until reaching the entirely closed state or the entirely open state, in response to detecting that the selection operation of selecting the first window is performed and the first operation input or the second operation input is performed with respect to the first window, when the seated person detecting unit detects that the seated person is present while the second window is being caused to perform the continuous operation that is performed until reaching the entirely closed state or the entirely open state according to the second operation input.

* * * * *